United States Patent
Bai et al.

(10) Patent No.: US 9,508,199 B2
(45) Date of Patent: Nov. 29, 2016

(54) MOBILE DEVICE COMMUNICATING WITH MOTOR VEHICLE SYSTEM

(71) Applicant: Honda Motor Co., Ltd., Tokyo, Minato-ku (JP)

(72) Inventors: Sue Bai, Novi, MI (US); Radovan Miucic, Southfield, MI (US)

(73) Assignee: HONDA MOTOR CO., LTD., Tokyo (JP)

( * ) Notice: Subject to any disclaimer, the term of this patent is extended or adjusted under 35 U.S.C. 154(b) by 117 days.

(21) Appl. No.: 13/963,062

(22) Filed: Aug. 9, 2013

(65) Prior Publication Data

US 2015/0046022 A1 Feb. 12, 2015

(51) Int. Cl.
| | |
|---|---|
| G07C 5/00 | (2006.01) |
| G01C 21/36 | (2006.01) |
| H04M 1/60 | (2006.01) |
| G01C 21/26 | (2006.01) |
| H04M 1/67 | (2006.01) |

(52) U.S. Cl.
CPC ............ *G07C 5/008* (2013.01); *G01C 21/26* (2013.01); *G01C 21/362* (2013.01); *H04M 1/6091* (2013.01); *H04M 1/67* (2013.01)

(58) Field of Classification Search
CPC .... G07C 5/008; G07C 5/0808; G07C 5/085; G07C 2205/02; G01M 17/007
USPC ............ 701/1, 117, 23, 25, 27, 3, 301, 300; 340/435, 447, 475, 905, 990
See application file for complete search history.

(56) References Cited

U.S. PATENT DOCUMENTS

| | | | |
|---|---|---|---|
| 6,807,464 B2 | 10/2004 | Yu et al. | |
| 6,999,754 B2 | 2/2006 | Hashimoto et al. | |
| 7,302,321 B2 | 11/2007 | Suzuki et al. | |
| 7,424,309 B1 | 9/2008 | Bengler | |
| 7,446,674 B2 | 11/2008 | McKenna | |
| 8,718,797 B1* | 5/2014 | Addepalli et al. ............... 700/17 |
| 2002/0161523 A1* | 10/2002 | Endo ............................ 701/213 |
| 2005/0149260 A1 | 7/2005 | Bae | |
| 2005/0231393 A1 | 10/2005 | Berger et al. | |
| 2007/0099626 A1 | 5/2007 | Lawrence et al. | |
| 2008/0177459 A1 | 7/2008 | Sutardja | |
| 2008/0177467 A1 | 7/2008 | Sutardja | |
| 2009/0033552 A1 | 2/2009 | Kirmuss et al. | |
| 2009/0160703 A1* | 6/2009 | Duffett-Smith ......... G01S 19/50 342/357.43 |
| 2009/0174572 A1 | 7/2009 | Smith | |
| 2012/0053888 A1* | 3/2012 | Stahlin .................... G01S 5/021 702/150 |
| 2014/0244156 A1* | 8/2014 | Magnusson et al. ......... 701/418 |
| 2014/0324337 A1* | 10/2014 | Bjernetun ......... B60W 50/0098 701/450 |

FOREIGN PATENT DOCUMENTS

JP 2004220139 8/2004

* cited by examiner

*Primary Examiner* — Jelani Smith
(74) *Attorney, Agent, or Firm* — Arent Fox LLP

(57) ABSTRACT

A vehicle system is in communication with a mobile device. The vehicle system receives information from the mobile device and determines the quality of the information. If the quality of the information is acceptable, the vehicle system may use the information from the mobile device. In addition, the quality of the information may be used to determine if the information should be sent to other vehicles.

26 Claims, 11 Drawing Sheets

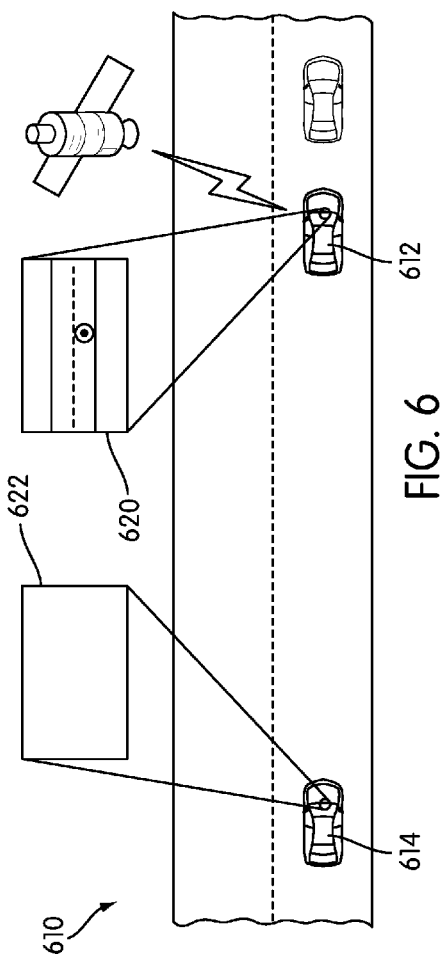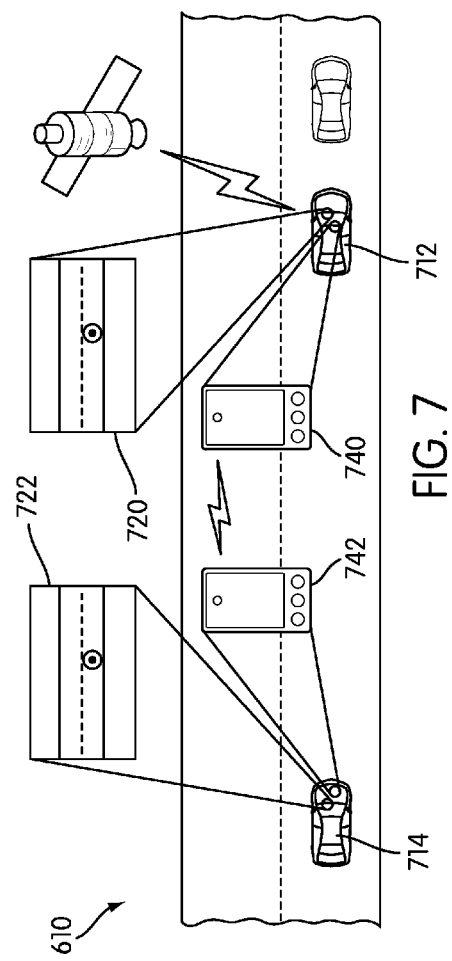

MOBILE DEVICE COMMUNICATING WITH MOTOR VEHICLE SYSTEM

BACKGROUND

The present embodiments relate generally to a motor vehicle and, in particular, to a motor vehicle system having mobile device integration features, as well as related methods.

Various systems for motor vehicles have previously been proposed including location-monitoring systems, navigation systems and accident avoidance systems. Some vehicle systems are configured to communicate with one or more remote systems in order to provide various kinds of real-time information. Systems that provide updated traffic information are used to determine more accurate travel times for a user along a particular route. Some vehicle systems are configured to communicate with a mobile device such as a cell phone or BLUETOOTH device to distribute information and for possible vehicle-to-vehicle communication.

SUMMARY

The embodiments provide a vehicle system and related methods. In one aspect, a vehicle system for a motor vehicle includes an electronic control unit configured for installation and use as part of a motor vehicle, an onboard navigation system, an interface configured for enabling communication between the navigation system and a mobile device and a computer-readable medium in communication with the electronic control unit having stored thereon computer-readable instructions for instructing the electronic control unit to perform actions. The computer readable instructions include receiving information from the mobile device, evaluating the quality of the information and integrating the mobile device with the navigation system for receiving further information from the mobile device.

In another aspect, a method for providing navigation information for a motor vehicle includes automatically sensing the presence of a mobile device proximate a motor vehicle, establishing communications between an onboard navigation system of the motor vehicle and the mobile device and receiving information from the mobile device. The method also includes evaluating the quality of the information from the mobile device, using the information from the mobile device to augment the operation of the onboard navigation system if the quality of the information from the mobile device is determined to be acceptable, and preventing the onboard navigation system from using the information from the mobile device if the quality of the information from the mobile device is determined to be unacceptable.

In another aspect, a method for providing navigation information for a motor vehicle includes establishing communications between an onboard navigation system of the motor vehicle and the mobile device, receiving initial information from the mobile device, evaluating the quality of the initial information from the mobile device, sending additional information from the mobile device to another vehicle if the quality of the initial information is acceptable and preventing any information from the mobile device from being sent to the other vehicle if the quality of the initial information is unacceptable.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The embodiments can be better understood with reference to the following drawings and description. The components in the figures are not necessarily to scale, emphasis instead being placed upon illustrating the principles of the embodiments. Moreover, in the figures, like reference numerals designate corresponding parts throughout the different views.

FIG. 6 is a schematic view of an embodiment for communication between mobile devices disposed within vehicles and/or vehicle-to-vehicle communication of information;

FIG. 7 is a schematic view of another embodiment for communication between mobile devices disposed within vehicles and/or vehicle-to-vehicle communication of information;

DETAILED DESCRIPTION

Figure 1:
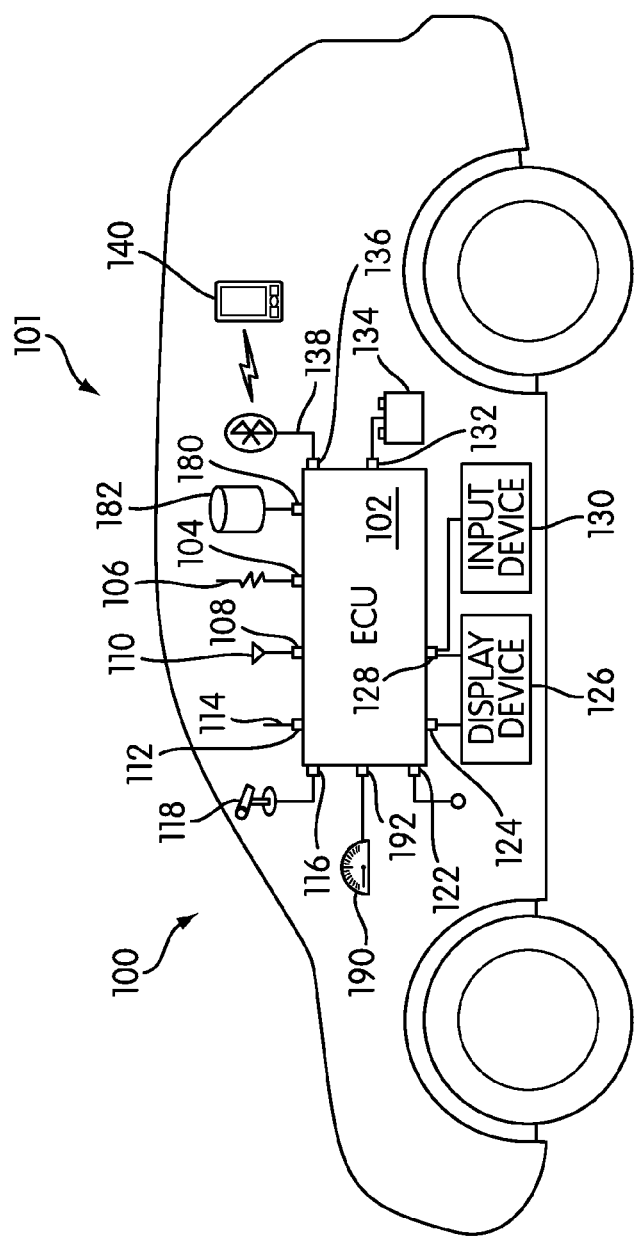
FIG. 1 is a schematic view of an embodiment of various components for a motor vehicle including a motor vehicle system.

FIG. 1 is a schematic view of a system for retrieving information for a motor vehicle. The term "motor vehicle" as used throughout this detailed description and in the claims refers to any vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the detailed description and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In some cases, a motor vehicle can utilize various types of information for operating one or more systems of the motor vehicle. Information can include any information used by one or more vehicle systems to determine vehicle operating conditions, environmental conditions, remote vehicle information as well as any other kind of information. For example, the information can include geographic or geospatial information pertaining to a motor vehicle's geographic, spatial and/or environmental information such as its location, directional orientation and altitude, its positioning relative to geography, topography, land features and objects like other vehicles or stationary objects. Vehicle operating information can also include environmental conditions near the vehicle such as traffic and weather information, its motion characteristics such as its velocity, acceleration, rotation and yaw rate, as well as navigation information. The information can be in any format, and can include analog data, digital data, binary data, numerical data, alphanumeric data as well as photographic and/or video information. For example, optical information in the form of photographs or videos can be used by one or more vehicle systems to determine the location of nearby objects, to identify landmarks, vehicle lanes, as well as any other information used by a vehicle system. The information can be used by one or more motor vehicle systems to provide advantageous features, such as navigation features and accident avoidance features.

Referring to FIG. 1, motor vehicle 100 can include various devices. In some configurations, motor vehicle 100 can include electronic control unit 102, hereby referred to as ECU 102. In some cases, ECU 102 may include a microprocessor, RAM, ROM, and software all serving to monitor and supervise various parameters of motor vehicle 100. For example, ECU 102 is capable of receiving signals from numerous sensors located in the engine and/or at other locations of motor vehicle 100. The output of various sensors is sent to ECU 102 where the sensor signals may be stored in an electronic storage, such as RAM. Both current and electronically stored sensor signals may be processed by a central processing unit (CPU) in accordance with software stored in an electronic memory, such as ROM.

ECU 102 can include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

The following ports and provisions associated with ECU 102 are generally optional. Some configurations may include a given port or associated provision, while others may exclude it. The following description discloses many of the possible parts and provisions that can be used; however, it should be kept in mind that not every part or provision must be used in a given configuration.

ECU 102 can include provisions for transmitting and/or receiving information from remote sources. ECU 102 includes a wireless network antenna port 104 that is designed to receive information from a wireless network antenna 106, a GPS antenna port 108 designed to receive information from a GPS antenna 110 and a radio antenna port 112 designed to receive information from a radio antenna 114.

ECU 102 can also include a number of items that facilitate human interaction. To receive vocal information from a user, ECU 102 can include a microphone port 116 that is capable of communicating with a microphone 118. ECU 102 can also include an audio port 122 that is designed to send audio information to one or more speakers (not shown) or audio devices. In some configurations, microphone port 116 and audio port 122 are conductors associated with a single physical connector. For example, microphone port 116 and audio port 122 can be female conductors of a multi-channel coaxial plug, like a standard 2.5 mm headset plug.

In order to provide visual information to a user, ECU 102 can include a display port 124 that is capable of interacting with a display device 126. To receive input from a user, ECU 102 can include an input port 128. Input port 128 can communicate with input device 130. In some configurations, display device 126 can also receive input from a user. In some configurations, display device 126 includes a touch screen that can receive input and in other configurations, display device 126 includes a number of buttons that can receive input. In some configurations, display device 126 includes both a touch screen and buttons. In some cases, user input received by display device 126 can also communicate with input port 128.

A power port 132 can connect ECU 102 to a power supply 134. In the configuration shown in FIG. 1, power supply 134 is a battery. In other embodiments any other type of power supply could be used. Moreover, in some cases, multiple power supplies could be provided.

ECU 102 can also include provisions for communicating with a mobile device, such as a mobile phone or handheld computer device. Any system can be used to facilitate this communication with a mobile device. A communication system may be wired or wireless. For example, in some cases a mobile device can be connected to ECU 102 using a physical circuit. In other cases, a mobile device can communicate with ECU 102 using a wireless system. In one embodiment, a low power radio frequency system can be used. In one embodiment, a wireless local or personal area network using the BLUETOOTH protocol can be used to facilitate communication with a mobile device. In other cases, a wireless local or personal area network can be used. In some cases, a network can be used employing any IEEE 802.15 or related protocol. In the configuration shown in FIG. 1, ECU 102 includes a local wireless network antenna port 136 that is designed to communicate with a local wireless network antenna 138, which in turn, is designed to communicate wirelessly with mobile device 140. It should be understood that while the example of local wireless network antenna 138 illustrated in the Figures is associated with the BLUETOOTH protocol, local wireless network antenna 138 may be associated with any suitable wireless local or personal area network protocol. In another configuration shown in FIG. 5, ECU 102 is designed to communicate with mobile device 140 via a wired connection as discussed in further detail below.

Generally, any type of mobile device can be used to communicate with ECU 102. Mobile device 140 can be any device capable of sending and receiving electronic information and/or data wirelessly including voice information. Examples of mobile devices include, but are not limited to: cell phones, smart phones, PDA's, digital media players, portable computers (such as laptops and netbooks), tablet computers, as well as any other mobile device that can send and/or receive information. In some cases, mobile device 140 may be configured to send and receive data including text messages, emails, graphical information, audio information, images, and videos, as well as other types of data, such as geospatial-related data.

In some configurations, ECU 102 can be configured to receive, store and/or process various types of information. In some configurations, ECU 102 can be configured to determine process and/or store vehicle operating information, such as navigation information. The term "navigation information" refers to any information that can be used to assist in determining a location or providing directions to a location. Some examples of navigation information include street addresses, street names, street or address numbers, apartment or suite numbers, intersection information, points of interest, parks, any political or geographical subdivision including town, township, province, prefecture, city, state, district, ZIP or postal code, and country. Navigation information can also include commercial information including business and restaurant names, commercial districts, shopping centers, and parking facilities.

Navigation information can also include location and/or geographical information, including information obtained from any Global Navigational Satellite infrastructure (GNSS), including Global Positioning System or Satellite (GPS), Glonass (Russian) and/or Galileo (European). The term "GPS" is used to denote any global navigational satellite system. Additionally, navigation information can include traffic information that may be used for accurately calculating travel times to various locations. Navigation information can include one item of information, as well as a combination of several items of information.

In some configurations, ECU 102 can include provisions for storing navigation information as well as other types of information. In the current configuration, ECU 102 may include database port 180 that is configured to communicate with database 182. Database 182 may be any type of database. Database 182 can include any kind of storage device, including but not limited to: magnetic, optical, magneto-optical, and/or memory, including volatile memory and non-volatile memory. In some configurations, database 182 is integral with ECU 102 and in other configurations database 182 is separate from ECU 102 and communicates with ECU 102. In some cases, database 182 may be configured to store various types of navigation information. For example, in some cases, database 182 may be configured to store various map information. In other cases, database 182 may be configured to store historical traffic information.

An information system 101 (FIGS. 1 and 4) can be formed from various entities including, for example, devices, modules, databases and software that cooperate to evaluate, process, calculate, monitor, assess, communicate or otherwise perform actions pertaining to various types of information, including location and/or navigation information for motor vehicle 100. These can include the various example components whether or not discussed herein that are generally part of motor vehicle 100, such as ECU 102 and database 182, as well as components whether or not discussed herein that are generally not part of motor vehicle 100, such as mobile device 140 or remote resources like entities associated with service provider 200 (FIG. 2) or GPS satellites.

In some configurations, motor vehicle 100 can include one or more provisions for detecting the vehicle speed of motor vehicle 100. In some cases, motor vehicle 100 can include one or more vehicle speed sensors. In the current configuration, for example, motor vehicle 100 includes vehicle speed sensor 190, which is in communication with ECU 102 through speed sensing port 192. In some cases, vehicle speed sensor 190 could be one or more wheel speed sensors. In other cases, vehicle speed sensor 190 could be configured to measure the speed of an input or output shaft of a transmission of motor vehicle 100 to determine the vehicle speed. In still other cases, vehicle speed sensor 190 could be any kind of vehicle speed sensor known in the art. In still another configuration, vehicle speed may be estimated using GPS location information. For example, in one configuration ECU 102 may detect the position of motor vehicle 100 using information received from GPS antenna 110. In some cases, the position information can be used to determine an approximate speed and/or acceleration of motor vehicle 100.

ECU 102 can also include memory, additional data storage provisions including one or more additional databases and/or one or more processors.

In some configurations, all or most of the items shown in FIG. 1 are housed in a single case or unit. In other configurations, the various items shown in FIG. 1 are not housed in a single physical case, but instead, are distributed throughout motor vehicle 100 and communicate with one another via known wired or wireless methods. For example, in a system where one or more items communicate wirelessly, the BLUETOOTH or another wireless communication protocol can be used.

Figure 2:
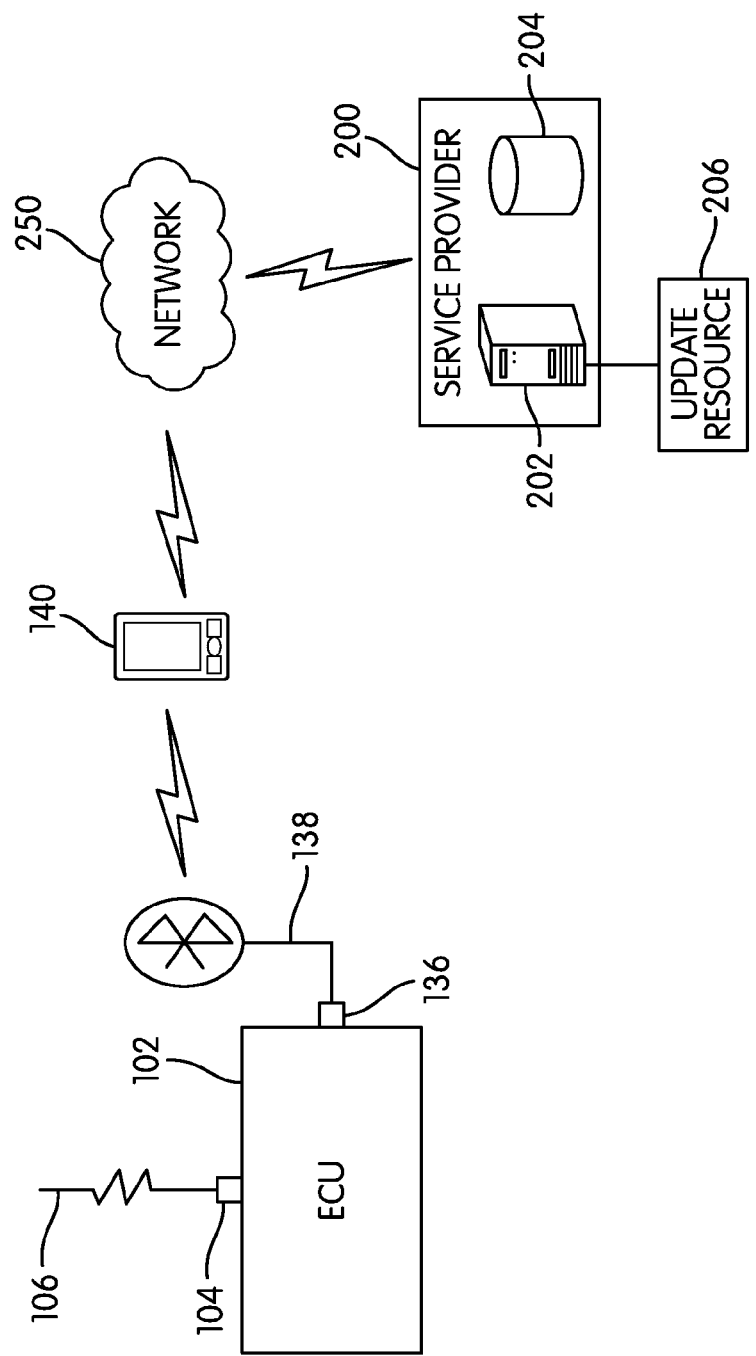
FIG. 2 is a schematic view of portions of an embodiment of a motor vehicle system in communication with a service provider.

Referring now to FIG. 2, ECU 102 may be configured to communicate with a service provider. A service provider may provide various services, such as navigation based services. In some cases, a service provider may provide map data to a motor vehicle. In other cases, a service provider may provide traffic information to a motor vehicle. In still other cases, a service provider may provide other kinds of information including, but not limited to: weather information, stock price information, and point of interest information, as well as other kinds of information. In one configuration, ECU 102 may communicate with service provider 200 via network 250, such as a wide area network.

In some configurations, service provider 200 can include a computer system 202 and a database 204 in communication with computer system 202. The term "computer system" refers to the computing resources of a single computer, a portion of the computing resources of a single computer, and/or two or more computers in communication with one another. In some cases, any of these resources can be operated by one or more human users. In one configuration, computer system 202 includes a server.

Computer system 202 may communicate with database 204. Database 204 can include any kind of storage device, including but not limited to: magnetic, optical, magneto-optical, and/or memory, including volatile memory and non-volatile memory. In some configurations, database 204 is integral with computer system 202 and in other configurations, database 204 is separate from computer system 202 and communicates with computer system 202. In some configurations, database 204 is used to store navigation information. In some configurations, database 204 includes traffic information.

In some configurations, an update resource 206 is in communication with service provider 200. Update resource 206 can provide updates, revisions, edits and other modifications to service provider 200. In some cases, update resource 206 provides updated navigation information. In some configurations, update resource 206 provides automated updates. In some configurations, update resource 206 provides periodic updates.

Motor vehicle 100 can communicate with service provider 200 using wireless network 250. Generally, network 250 can be any kind of wireless network, including but limited to: any cellular telephone network using, for example, any one of the following standards: CDMA, TDMA, GSM, AMPS, PCS, analog, W-CDMA, WiMAX and/or LTE.

Service provider 200 can communicate with network 250 in a number of different ways. In some configurations, service provider 200 communicates with network 250 wirelessly. In other configurations, service provider 200 is directly connected to one or more elements of network 250, and in still other configurations, service provider 200 communicates with network 250 by using the Internet. In some configurations, service provider 200 can use more than one method of communicating with wireless network 250 or use other methods as back-ups.

Figure 3:
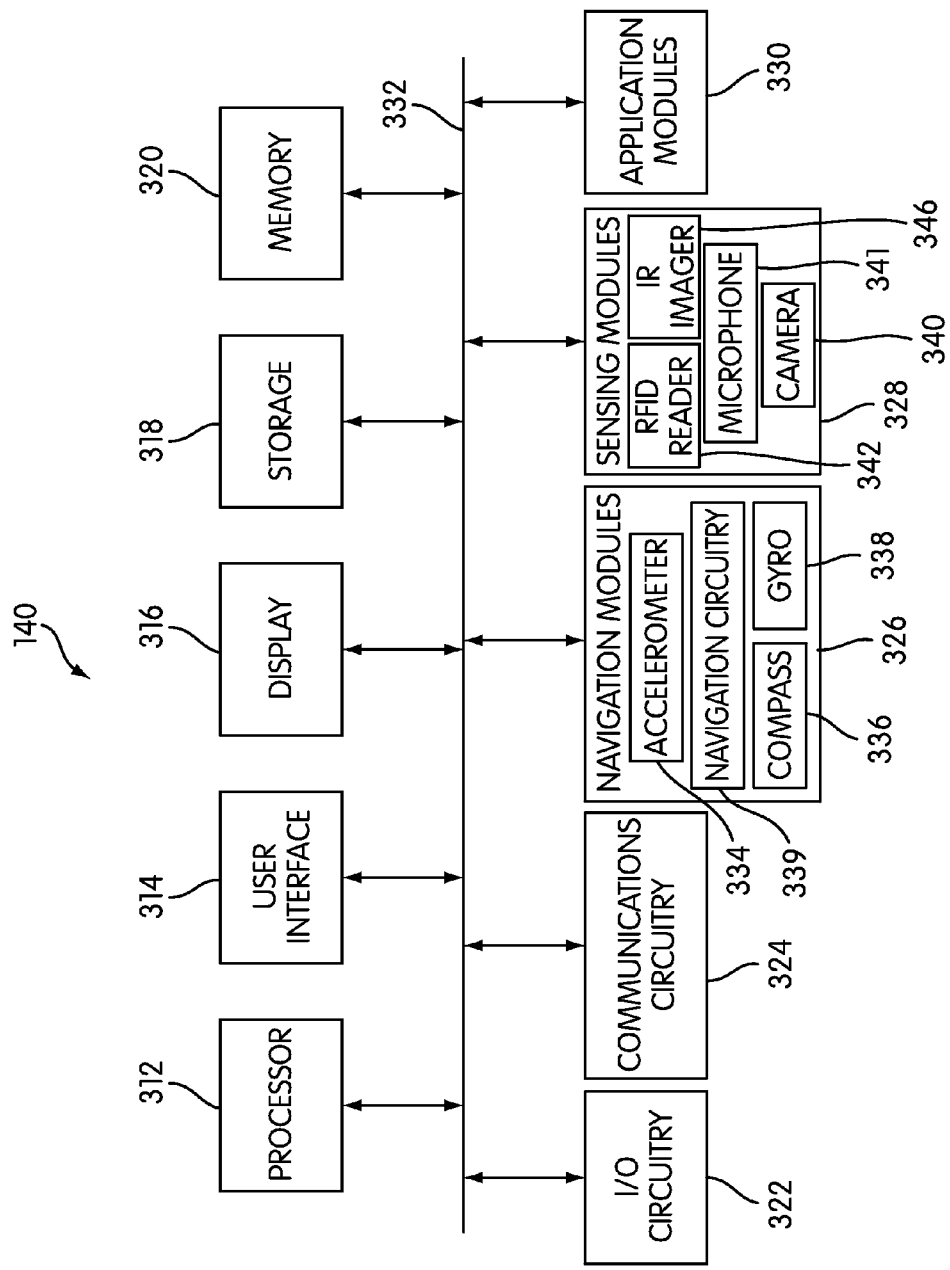
FIG. 3 is a schematic view of an embodiment of an example mobile device having an information system.

Referring to FIG. 3, a simple block diagram is shown of an example configuration of mobile device 140. Mobile device 140 can be any type of mobile device, such as a multi-function device like a combination multimedia/mobile terminal/telephone device. In some cases, mobile device 140 can be in compliance with any available mobile telecommunications standard, such as GSM, UMTS, D-AMPS, CDMA2000, FOMA, TD-SCDMA, etc., and any wired and/or wireless communication standard, such as transport, networking and connectivity via BLUETOOTH, IrDA, RF, TCP/IP, etc. Mobile device 140 can be battery-operated and portable. Moreover, in some cases, mobile device 140 can be configured to interface with ECU 102 in various ways as noted above including via a dock 550 (FIG. 5) providing a powered or unpowered wired interface with ECU 102. Mobile device 140 can also be a portable electronic device configured primarily to provide specific kinds of information, such as a GPS based portable vehicle navigation device.

Mobile device 140 can include a processor 312, a user interface 314, a display 316, storage 318, memory 320, input/output circuitry 322, communication circuitry 324, navigation modules 326, sensing modules 328, application modules 330 and communications bus 332. In some configurations, mobile device 140 can include more than one of each component or circuitry shown in FIG. 3, as well as other components and circuitry.

Processor 312 can include, for example, circuitry for and be configured to perform any function. Processor 312 can be used to run operating system applications, media playback applications, media editing applications, and/or any other application, and can also manage application modules 330 for running applications associated with particular modules. Processor 312 can drive display 316 and can receive user inputs from user interface 314.

User interface 314 can allow a user to interact with portable electronic device 140 and can be in various forms, such as one or more buttons, a keypad, a dial, a click wheel, a touch screen or any combination thereof. Display 316 can accept and/or generate signals for presenting media information (textual and/or graphic) on a display screen. For example, display 316 can include a coder/decoder (CODEC) to convert digital media data into analog signals. Display 316 also can include display driver circuitry and/or circuitry for driving display driver(s). The display signals can be generated by processor 312 or display 316. The display signals can provide media information related to media data received from communications circuitry 324 and/or any other component of portable electronic device 140. In some configurations, display 316, like any other component discussed herein, can be integrated with and/or externally coupled to mobile device 140.

Storage 318 can be, for example, one or more storage mediums, including for example, a hard-drive, flash memory, permanent memory such as read-only memory (ROM), semi-permanent memory such as random access memory (RAM), and any other suitable type of storage component or any combination thereof. Storage 318 can store, for example, media data (e.g., music and video files), application data (e.g., for implementing functions on device 140), firmware, preference information data (e.g., media playback preferences), wireless connection information data (e.g., information that may enable device 140 to establish a wireless connection or identify and connect with ECU 102), and any other suitable data or any combination thereof.

Memory 320 can include one or more different types of memory that may be used for performing device functions. For example, memory 320 can include cache, Flash, ROM, RAM, or one or more different types of memory used for temporarily storing data. Memory 320 may be specifically dedicated to storing firmware. For example, memory 320 can be provided for storing firmware for device applications (e.g., operating system, user interface functions, and processor functions).

Input/output circuitry 322 can convert (and encode/decode, if necessary) data, analog signals and other signals (e.g., physical contact inputs, physical movements, analog audio signals, etc.) into digital data, and vice-versa. The digital data may be provided to and received from processor 312, storage 318, memory 320, and/or any other component of mobile device 140. Although input/output circuitry 322 is illustrated in FIG. 3 as a single component of mobile device 140, a plurality of input/output circuitry may be included in mobile device 140. Input/output circuitry 322 can be used to interface with any input or output component, such as those discussed in connection with FIGS. 1 and 2 or FIGS. 4 and 5 discussed hereafter. For example, mobile device 140 can include specialized input circuitry associated with input devices such as, for example, one or more microphones, cameras, proximity sensors, accelerometers, ambient light detectors, etc. Mobile device 140 can also include specialized output circuitry associated with output devices such as, for example, one or more speakers, etc.

Communications circuitry 324 can permit mobile device 140 to communicate with one or more servers or other devices using any suitable communications protocol. For example, communications circuitry 324 can support Wi-Fi (e.g., a 802.11 protocol), Ethernet, BLUETOOTH communications, high frequency systems (e.g., 900 MHz, 2.4 GHz, and 5.6 GHz communication systems), infrared, TCP/IP (e.g., any of the protocols used in each of the TCP/IP layers), HTTP, FTP, RTP, RTSP, SSH, and any other communications protocol or any combination thereof.

Navigation modules 326 can include any suitable circuitry, devices, software and technology for evaluating, determining, calculating, monitoring or otherwise processing location, spatial, orientation, navigation and other geospatial-related information, as well as other kinds of information including environmental condition information, vehicle motion information or any other kind of information. For example, navigation modules 326 can include entities like one or more accelerometers 334, compasses 336 and/or gyros 338 for evaluating the location, motion and orientation of a vehicle. Navigation modules 326 can also include navigation circuitry 339, such as GPS circuitry for processing GPS information. Moreover, in other embodiments, any other suitable components used for sensing or processing navigation information could be incorporated into mobile device 140.

Sensing modules 328 can include any suitable type of technology for detecting, identifying and/or monitoring environmental features including any objects in the environment of a motor vehicle. For example, identification module 328 can include radio-frequency identification (RFID) tag readers 342, an infrared (IR) image capture device 346, a camera 340 capable of identifying objects and other identification modules, devices or circuitry (not shown), such as a barcode scanner, biometric reader, proximity card reader, an electronic product code reader, any other detection technology, or any combination thereof. In some configurations, identification module 328 can activate a camera that is operative for capturing images of objects to be identified, such as geospatial-related objects (e.g., stop sign identification, lane tracking, road geometry, intersection location, etc.) In some configurations, identification module 328 can activate an IR image capture device (e.g., camera or sensors) that is operative for capturing IR images of the objects to be identified. Camera 340 can include any type of camera such as a digital camera, a film based camera, a video camera or any other kind of camera. Moreover, in some cases, microphone 341 can be used to detect audio information. Persons skilled in the art will appreciate that identification module 328 can use any suitable pattern recognition algorithms to identify objects.

Bus 332 can provide a data transfer path for transferring data to, from, or between processor 312, storage 314, display 316, storage 318, memory 320, input/output circuitry 322, communications circuitry 324, navigation modules 326, sensing modules 328, application modules 330, etc.

Figure 4:
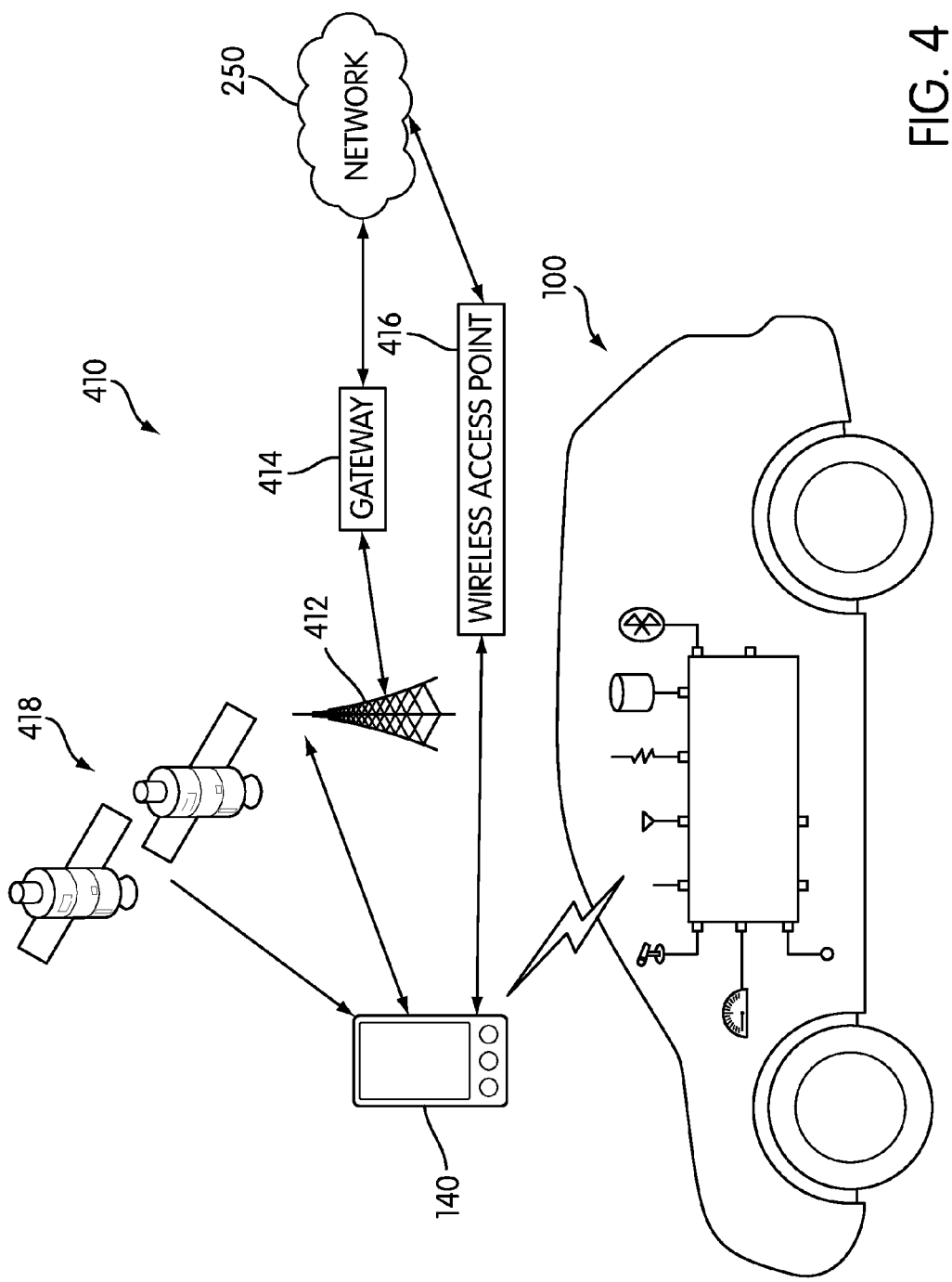
FIG. 4 is a schematic view of portions of an embodiment of an information system including a configuration for communicating with other devices and networks.

Referring to FIG. 4, an example network operating environment 410 is show for mobile device 140 of FIGS. 1 and 3. Mobile device 140 can, for example, communicate over one or more wired and/or wireless networks for data communication. For instance, mobile device 140 can communicate over a telecommunications (e.g., cellular) network through wireless communications via towers 412, which can permit communication with a network 250 (such as a wide area network like the Internet), by use of a gateway 414. Further, a wireless access point 416, such as an 802.11g wireless access device, can provide communication access to the network 250. In some configurations, both voice and data communications can be established over the network 250 and wireless access point 416. For example, mobile device 140 can place and receive phone calls (e.g., using VoIP protocols), send and receive e-mail messages (e.g., using POP3 protocol), and retrieve electronic documents and/or streams, such as web pages, photographs, and videos, via wireless communications through base stations 412 and/or wireless access point 416 and network 250 (e.g., using TCP/IP or UDP protocols).

Mobile device 140 can also establish communications by other means. For example, mobile device 140 can communicate with other wireless devices, e.g., other wireless devices 140, cell phones, etc., via peer-to-peer communications, e.g., a personal area network, by use of one or more communication subsystems, such as BLUETOOTH, or through vehicle-to-vehicle communications when connected to ECU 102. Other communication protocols and topologies can also be implemented. Further, mobile device 140 can, for example, communicate with one or more services and/or one or more content publishers over the one or more wireless networks. For example, a geospatial-related service, such as a navigation service, can provide navigation information, map information, location information, route information, and other vehicle operating information to mobile device 140.

Mobile device 140 can also communicate with one or more GPS Satellite(s) 418 to enable circuitry and sensors (e.g., a GPS receiver on the mobile device) for location determining capability and related geospatial capabilities. According to one configuration, the location of mobile device 140 can be sensed using information received from orbiting GPS satellites using a GPS receiver. The present latitude and longitude of the mobile device can be determined and shown on display 316 along with map information. In another configuration, the location of mobile device 140 can be sensed based on the timing of signals to or from nearby cellular base stations 412.

As noted above along with FIG. 3, in some configurations, mobile device 140 can include one or more devices, circuitry or modules for evaluating movement, orientation and other geospatial information, such as accelerometers 334, compasses 336, gyros 338, etc. One or more of an accelerometer 334, compass 336, and gyro 338 can be used alone or in combination to measure movements of device 140. Additional sensors can be located external to mobile device 140, for example, on vehicle 100, and can communicated with mobile device 140 via a wired or wireless connection. Information from accelerometers, a compass, gyros, etc. can be used alone or in combination, for example, to measure the movement of mobile device 140 from a point of origin or known location to calculate the device's location relative to the point of origin. These types of location measurement techniques of this type are generally referred to as "dead reckoning," which can be used in conjunction with other location measurement techniques such as GPS and used in cases where no satellite or terrestrial positioning signal information is available.

Figure 5:
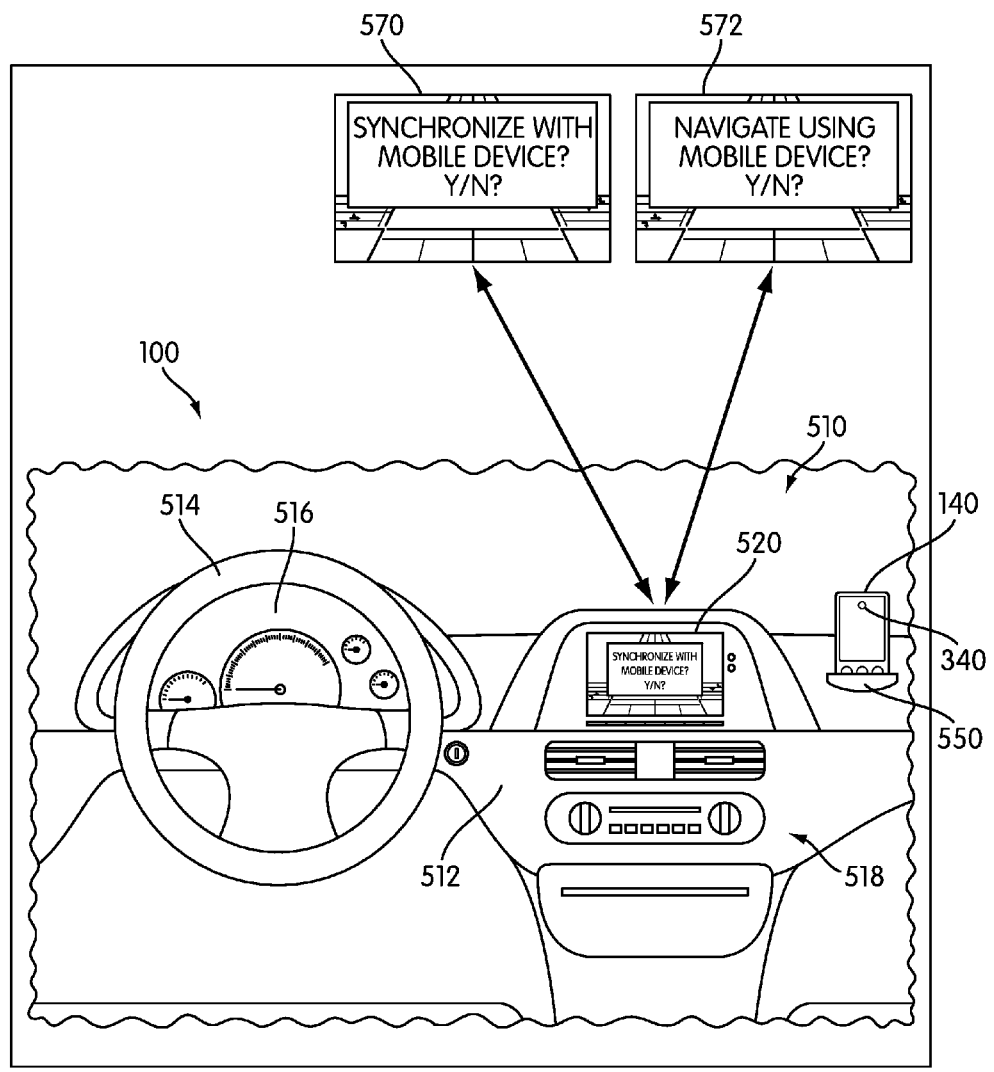
FIG. 5 is a perspective view of an embodiment of a dashboard region of the motor vehicle of FIG. 1 illustrating a configuration of the mobile device of FIGS. 1 and 3.

FIG. 5 illustrates an example configuration of an interior vehicle region 510 disposed proximate a dashboard 512 of example motor vehicle 100, which shows mobile device 140 retained in a dock 550 of dashboard 512. Dashboard 512 can include a steering wheel 514 and an instrument panel 516. In some configurations, dashboard 512 can further include a center portion 518 displaying information on display 520, such as navigation information, accident-avoidance information and user-interface communications (e.g., options or input related to the geospatial system). In some cases, center portion 518 can include one or more devices associated with an interior of a motor vehicle. Examples include, but are not limited to: audio devices, video devices, navigation devices, as well as any other types of devices. In addition, center portion 518 can be associated with controls for one or more systems of motor vehicle 100 including, but not limited to, climate control systems and other types of systems.

A motor vehicle can include provisions for displaying information from one or more vehicle systems, such as a navigation system. In some configurations, a motor vehicle can include a display device of some kind, such as display 520. In some cases, a motor vehicle can include a video screen for displaying information from a vehicle system. Examples of display devices include, but are not limited to: LCDs, CRTs, ELDs, LEDs, OLEDs, as well as other types of displays. In other cases, a display device could be a projection type display device that is configured to project an image onto one or more surfaces of motor vehicle 100. It will be understood that a display device may not be limited to a video screen or projection type display device. In one embodiment, display 520 may be an LCD screen.

In some embodiments, display 520 can be disposed within center portion 518. However, it will be understood that in other embodiments, display 520 can be located in any portion of motor vehicle 100 as long as display 520 can be viewed by a driver. For example, in another embodiment, display 520 may be a projection type device that displays an image onto a front window. In addition, display 520 may be used to display information from multiple vehicle systems. In one embodiment, information from a navigation system and a collision warning system could be provided on display 520.

A display device can be configured to display one or more images associated with controlling and using a vehicle system. For purposes of clarity, the following detailed description discusses example configurations of a vehicle system utilizing mobile device 140 as an integrated part of the vehicle system.

The example shown in FIG. 5 includes mobile device 140 being retained in dock 550 in a wired connection with ECU 102 via the dock. The wired connection with mobile device 140 can be, for example, via a USB connection, a compact flash interface, a secure digital interface, or another appropriated type of wired connection. In other configurations, mobile device 140 can communicate with ECU 102 and other components of a vehicle system via a wireless connection such as IEEE 802.x, BLUETOOTH, or other wireless communication formats.

In some configurations, dock 550 can be disposed in a position that encourages advantageous use of geospatial capabilities of mobile device 140. For instance, dock 550 can retain mobile device 140 in a position to enhance operation of one or more of its sensing modules 328 (see FIG. 3), such as directing camera 340 to permit a forward view through the motor vehicle windshield for identification of objects, such as road features, other vehicles, etc. In another example, dock 550 can retain mobile device 140 in a position to enhance operation of other modules or circuitry, such as to encourage reception of wireless signals for communication purposes or to encourage reception of GPS or other geospatial-related signals.

In some configurations, mobile device 140 can be configured to communicate with ECU 102 and other vehicle device(s) to transmit and/or receive information from ECU 102 or other vehicle device(s). Information can include a current location of vehicle 100, the location of a desired destination, the location or identity of an object, navigation information (including routes), address information, configuration settings, historical route information, traffic information, and the like. In some configurations, information can be repeatedly communicated between a vehicle system and mobile device 140 including sharing real-time or near real-time information. The information can be communicated via a data retrieval request (i.e., a 'pull procedure') or automatically (i.e., a 'push procedure') based on configuration instructions for the vehicle system, mobile device 140 or both.

According to some configurations, the location of mobile device 140 and vehicle 100 communicated therebetween can include latitude and longitude information, map information, vehicle orientation information (e.g., direction), movement information, etc. Further, the information transmitted between a vehicle system and mobile device 140 can include preference information, such as driver/user preferences for routes, locations, historical route information, etc.

In some embodiments, upon placing mobile device 140 into dock 550, display 520 may show one or more prompts. For example, in some cases, prompt 570 is shown. Prompt 570 comprises a sequence of words such as "Synchronize With Mobile Device Y/N?", which allows a user to determine if the mobile device should be synchronized with one or more vehicle systems. The user may select yes or no using a touch screen type display, or using one or more physical buttons inside the vehicle. In embodiments where the vehicle system is a navigation system, prompt 572 may be displayed once the mobile device has been synchronized with the navigation system. In this case, prompt 572 includes the sequence of words "Navigate using Mobile Device Y/N?", which allows a user to determine if the navigation system should operate according to information obtained from the mobile device. Although two examples of prompts are shown, in other embodiments any other information may be displayed in order to query a user or otherwise inform a user about the synchronization process and/or operation of a vehicle system.

Figure 8:
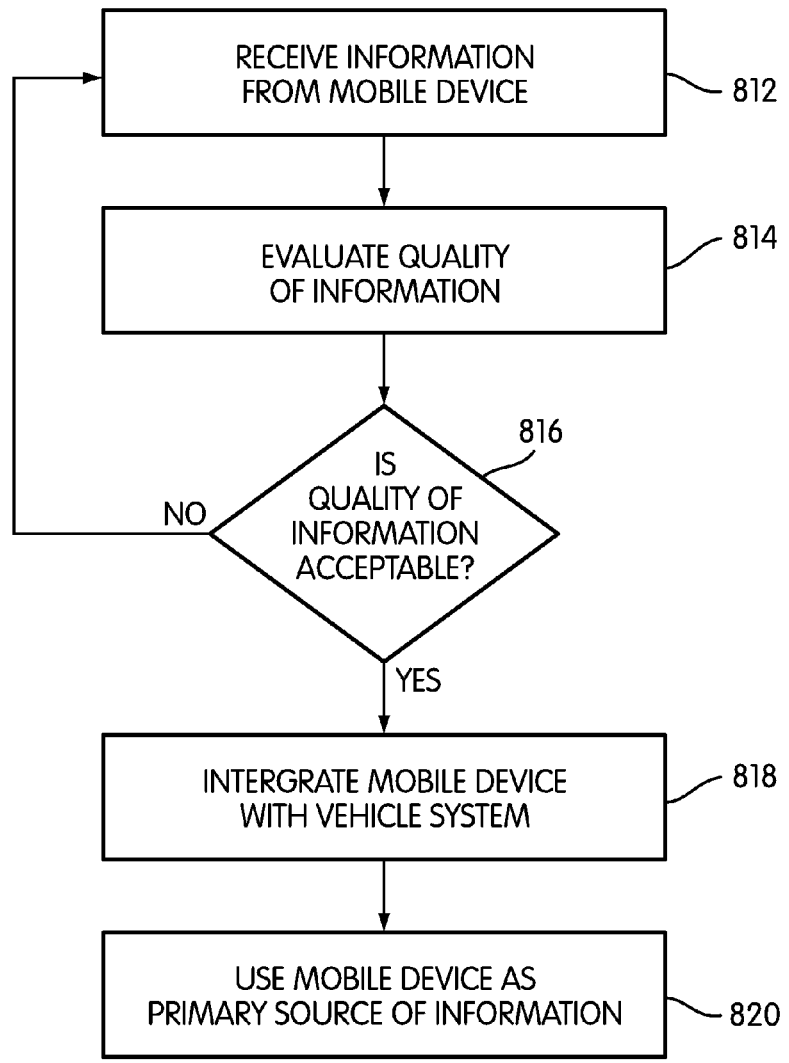
FIG. 8 is an embodiment of a process for integrating a mobile device into a motor vehicle information system.

FIGS. 7 and 8 illustrate use of communication capabilities of mobile device 140 and/or vehicle-to-vehicle communications for communicating information between nearby vehicles. In some configurations, mobile device 140 can enable communication with other vehicles that do not have vehicle-to-vehicle communications capabilities and that may not have onboard systems such as accident-avoidance systems or navigation systems. This can allow, for example, a vehicle to receive navigation information from a remote vehicle equipped with an onboard navigation system. Likewise, this arrangement allows for vehicles to receive accident information, traffic information, weather information as well as any other kind of information from remote vehicles equipped with systems for sensing such information.

FIG. 6 illustrates a scenario 610 where a first vehicle 612 is equipped with a GPS system that allows for an accurate determination of the location of first vehicle 612. This is indicated schematically on display screen 620 of first vehicle 612. In contrast, in this scenario, second vehicle 614 is not equipped with a GPS system. Therefore, the location of second vehicle 614 cannot be accurately determined and displayed on display screen 622 of second vehicle 614.

In many configurations, use of mobile devices can expand vehicle-to-vehicle information sharing to vehicles not equipped with onboard vehicle systems (such as onboard navigation systems), or equipped with vehicle systems having low functionality. This arrangement can greatly improve operation of vehicle systems overall via the additional data. As seen in FIG. 7, in scenario 710, first vehicle 712 having a mobile device 740 disposed within the vehicle can communicate geospatial information with second vehicle 714 travelling in the same direction and also having a mobile device 742 therein. In this case, GPS information received by first vehicle 712 can be communicated to second vehicle 714. This arrangement allows the location of second vehicle 714 to be accurately determined and utilized by an onboard navigation system of second vehicle 714. Using this arrangement, the functionality of a navigation system operating within second vehicle 714 is augmented by integrating mobile device 742 into the navigation system and thereby providing additional navigation information.

Although the embodiments shown in FIGS. 6 and 7 show the augmentation of a navigation system through the use of a mobile device, it will be understood that in other embodiments any other vehicle systems could be augmented using a mobile device. Moreover, a navigation system can be augmented in other ways including providing additional sources of navigation information as well as any other sensory information through the integration of a mobile device. For example, the camera of a mobile device can capture images that may be communicated to an onboard navigation system of the motor vehicle for purposes of identifying various objects and/or other environmental data.

FIG. 8 illustrates an embodiment of a process for operating a vehicle system with information obtained using a mobile device. In some embodiments, some of the following steps could be accomplished by a vehicle system of a motor vehicle. In some cases, some of the following steps may be accomplished by an ECU of a motor vehicle. In other embodiments, some of the following steps could be accomplished by other components of a motor vehicle. It will be understood that in other embodiments one or more of the following steps may be optional.

In some cases, the vehicle system could be a navigation system or geospatial system. In other cases, however, the vehicle system could be any other type of system that provides functionality for a user or that is associated with the operation of the motor vehicle more generally.

Referring now to FIG. 8, in a first step 812, the vehicle system can receive initial information from the mobile device. In some configurations, the information could be, for example, be an initial set of information received from the mobile device over a particular time period for the purposes of quality and integrity verification. In some configurations, the information could be received when the associated motor vehicle is moving to allow for evaluation of changing data, such as changing location, speed, environment, etc. In some configurations, the time period can vary for differing conditions and/or for different modules, devices, features, etc. For instance, a relatively short time period might be appropriate for verifying GPS information due to the availability of various inherent error monitoring mechanisms typically included with GPS systems, but a comparatively longer time period might be appropriate for evaluating the quality and accuracy of accelerometer data to provide a sufficient data set for evaluation purposes.

In a second step 814, the vehicle system can evaluate the quality of the initial information, such as evaluating the accuracy or validity of the information. In some configurations, step 814 can include performing error calculations on the information. In some configurations, step 814 can include comparing the initial information with information from the onboard vehicle system. In further configurations, step 814 can include comparing the initial information with standard information, such as map data in the case where the vehicle system is a navigation system. In some configurations, the initial information can be deemed to be acceptable if it meets an accuracy threshold, such as error calculations returning error values below an acceptable limit, comparisons with onboard system determined data being below an acceptable difference, or location information matching map data within an acceptable distance. These and other ways of evaluating the accuracy of the information are discussed in more detail along with FIG. 12.

In the third step 816, the vehicle system may determine if the quality of the initial information is acceptable. If not, the vehicle system may proceed back to step 812 to receive more information. If so, the vehicle system may proceed to step 818. In situations where the quality of the initial information is deemed to be acceptable, but not high, step 818 can include integrating portions of the mobile device with the vehicle system or conducting further testing.

In step 818, the mobile device may be integrated with the vehicle system. This can include integrating one system, some systems or all system of the mobile device. For example, the entire mobile device can be integrated and thus, geospatial, communication or other appropriate features and functionalities can be used as an integrated part of the vehicle system. As such, the vehicle system could have redundant features and data sources once the mobile device has been integrated into the vehicle system, particularly if similar features exist with the onboard system. The vehicle system can use the redundancies for error checking, verification, improved accuracies, etc. Further, in some configurations, the vehicle system can maintain duplicate functionality in reserve or disable duplicate functionality.

In some configurations, the vehicle system can replace onboard functionality with mobile device functionality. In some cases, during an optional step 820, the vehicle system may use the mobile device as the primary source of one or more types of information. For example, in situations where a mobile device is equipped with a navigation module having enhanced map information over the map information available from the onboard navigation system, the map information from the mobile device may be set as the primary source of map information. This can be useful since navigation information (including map information) for mobile devices may be updated more regularly than navigation information stored onboard of a motor vehicle.

Figure 9:
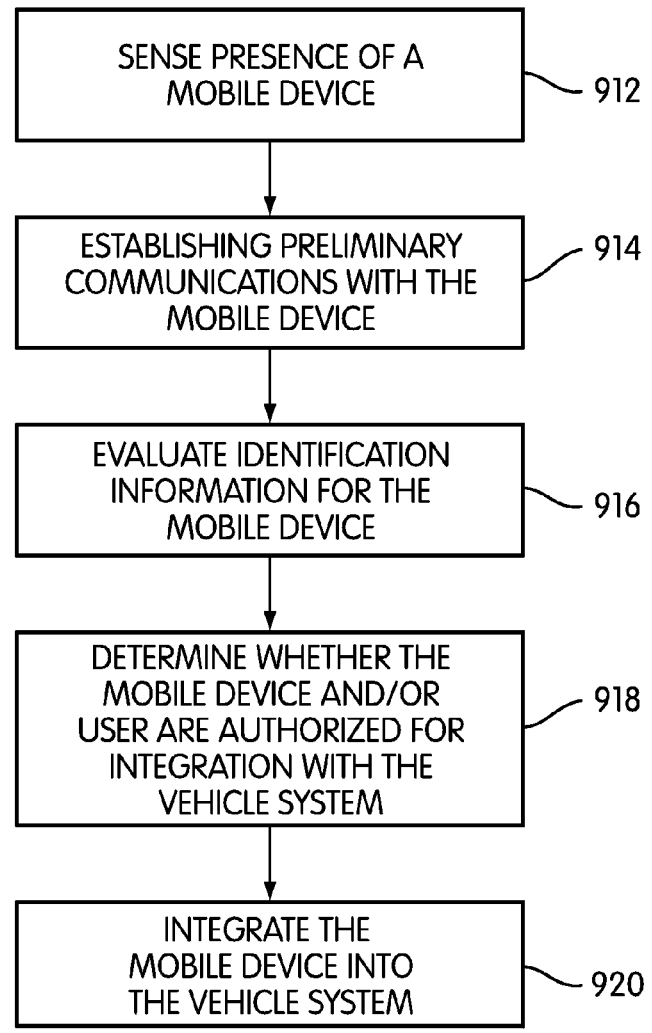
FIG. 9 is an embodiment of a process for automatically integrating a motor a mobile device into a motor vehicle system.

In some configurations, the mobile device can be automatically integrated into the vehicle system. FIG. 9 illustrates an embodiment of a method for automatically integrating a mobile device into a vehicle geospatial system. As shown, a step 912 can include the vehicle system automatically sensing presence of the mobile device, such as via sensing a wired connection (e.g., a universal serial bus (USB) connection or installation of the mobile device into a dock) or a wireless connection (e.g., BLUETOOTH or 802.11 connection) with the mobile device.

Another step 914 can include the vehicle system establishing preliminary communications with the mobile device. In some configurations, the vehicle system can further perform step 916 of evaluating user information for the mobile device, such as via retrieving user identification information from the mobile device, and step 918 of determining if the mobile device and/or user are authorized for integration with the vehicle system. In some cases, during step 918 or another optional step, the vehicle system may determine if the mobile device is pre-configured for integration (for example, determining if the proper protocol is in place for communicating between the vehicle system and the mobile device). In step 920, the mobile device may be integrated into the vehicle system. In some situations, in addition to communicating data between the mobile device and the vehicle system, preferences from the mobile device could be synchronized with the vehicle system or vice/versa.

Figure 10:
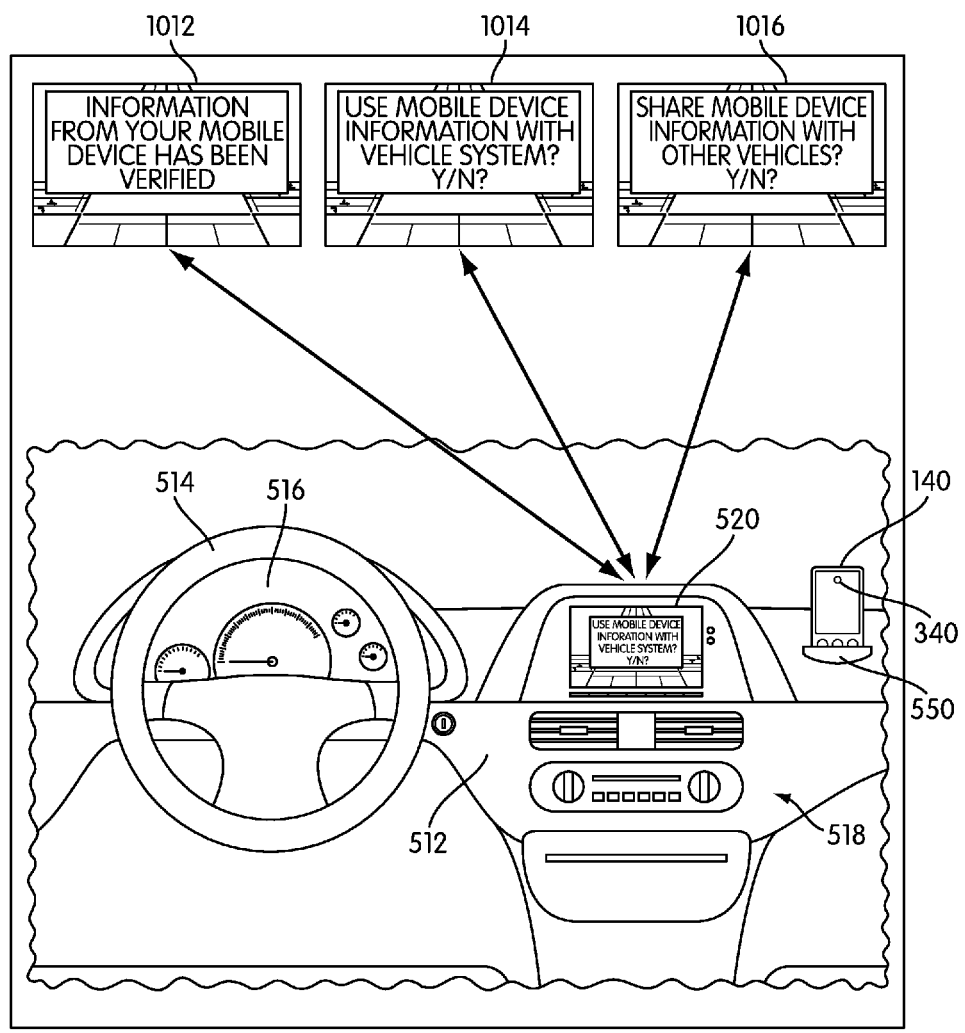
FIG. 10 is a perspective view of an embodiment of a dashboard region of a motor vehicle.

As illustrated in FIG. 10, in some configurations, ECU 102 can be configured to notify the user of the outcome of the quality evaluations for mobile device 140. Screen 1012 shows a scenario in which the user is notified that the information from mobile device 140 has been verified as sufficiently accurate and/or reliable for use with the vehicle system.

In some configurations, the user can be provided with a choice whether to use information from the mobile device even if the information has been verified. For instance, example screen 1014 provides the user with the option whether to use the mobile device information, which can be provided for a certain period of time (e.g., 5 seconds or much longer, such as 30 seconds to a minute or more), after which the vehicle system can follow a default position that may have been established previously by the user. In an example scenario, the user may have provided preference information at an earlier time for the default position to be integrated use of the verified mobile device information with the vehicle system, but without providing the mobile device information to other vehicles through vehicle-to-vehicle communications or in other ways, such as mobile device to mobile device communications. In other scenarios, the default position may be exclusion of the mobile device information from the vehicle system, even if verified, unless or until the user provides explicit authorization in response to a query, such as screen 1014, or in other ways like the user modifying the default setting to allow use of the mobile device information.

In addition, it may be desirable in some cases to restrict use of information from mobile device 140 to its host vehicle rather than permitting it to be transmitted to other vehicles via vehicle-to-vehicle communications. For example, as illustrated by screen 1016 in FIG. 10, in some cases a user may choose to allow use of mobile device data with the vehicle system (entering "Y" for screen 1014) while restricting the sharing of mobile device data with other vehicles, or vice-versa. It may be desirable, for instance, to provide data from the mobile device to the host vehicle to augment its vehicle system and withhold communicating information from the mobile device to other vehicles if the user planned to make phone calls, access emails or have other actions with the mobile device that could affect communication of its data. In a reverse situation, it may be desirable to withhold information from the host vehicle and ECU 102 if the host vehicle's system provides information having greater accuracy than the mobile device, while still permitting the mobile device information to be shared with other vehicles (or mobile devices in those vehicles) to provide beneficial information that may be unavailable to those vehicles.

Figure 11:
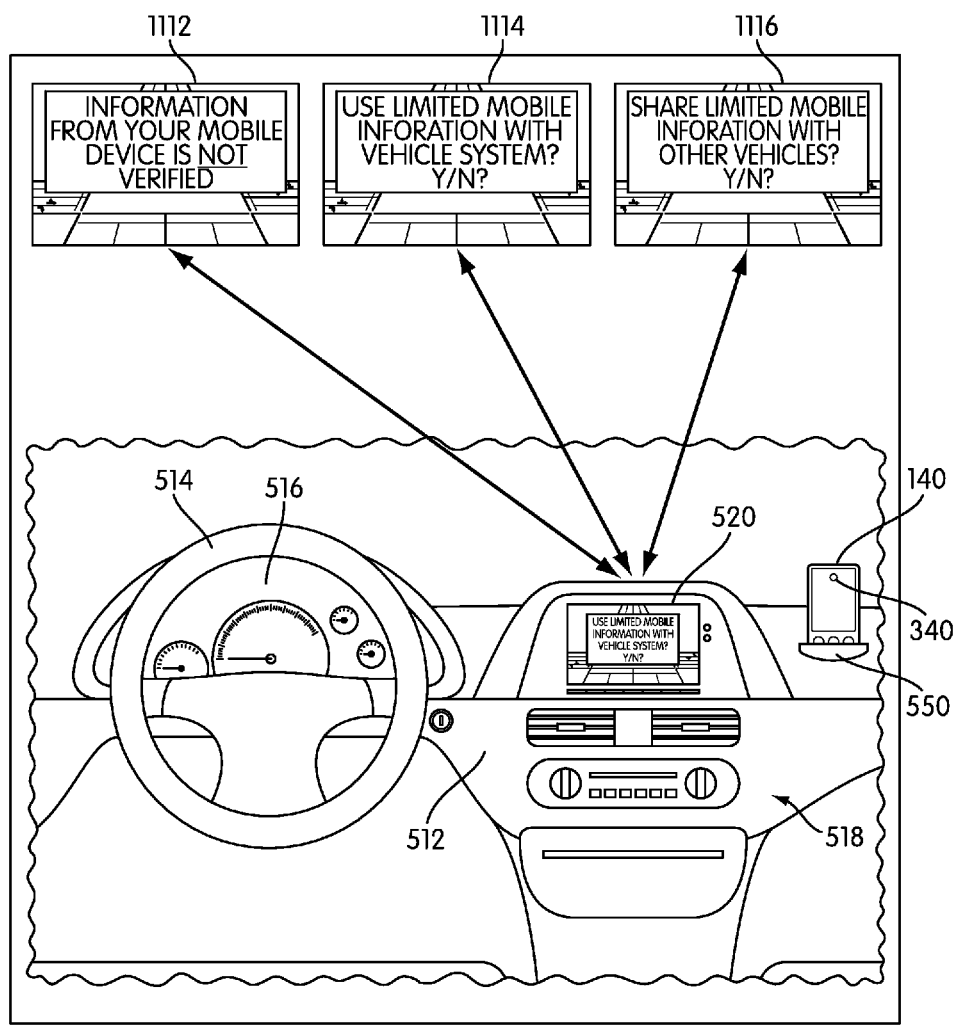
FIG. 11 is a perspective view of an embodiment of a dashboard region of a motor vehicle.

Referring now to FIG. 11, in some configurations and scenarios, mobile device information can fail to meet acceptable quality limits for integrating the device with the vehicle system—particularly for evaluations requiring highly reliable data, such as accident avoidance evaluations. As such, in some cases, ECU 102 can provide a notification that the mobile information has not been verified for integration with the vehicle system. Screen 1112 of FIG. 11 shows an example notification that mobile device 140 is not verified for integration with the vehicle system. In addition, screen 1114 and screen 1116 provide options for the user to permit limited use of information from mobile device 140 with either or both the host vehicle's system and other vehicles. This can be beneficial for sharing less critical information, such as travel history information. It can also be beneficial for providing information that may not be otherwise provided via vehicle systems, such as landscape images sensed by the camera of mobile device 140 while retained in cradle 550 (e.g., an upcoming stop sign). In other embodiments, mobile device information may be associated with real-time information that is not available from the onboard vehicle system. For example, mobile device 140 may provide real-time traffic or weather information that is not provided via vehicle systems.

Figure 12:
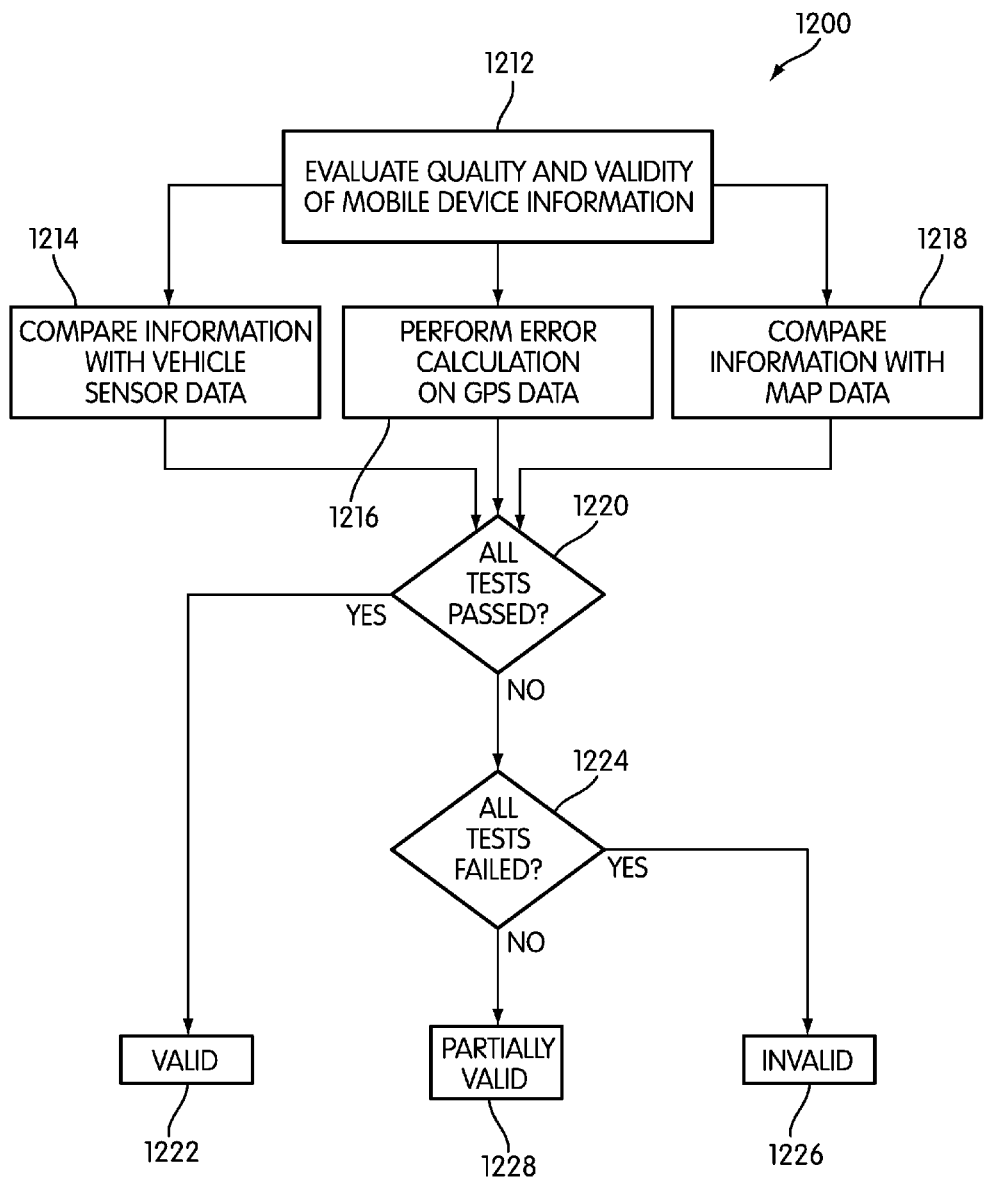
FIG. 12 is an embodiment of a process for evaluating the quality of information gathered from a mobile device.

Referring now to FIG. 12, a method is shown for implementing the use of mobile device information with an onboard motor vehicle navigation system. In some cases, the method can be included as part of step 814 of the method shown in FIG. 8. In a first step 1212 of the method, the navigation system can evaluate the quality of the mobile device information, such as evaluating the accuracy or validity of the data. Step 1214 to step 1226 can be sub-steps that are part of step 1212 in various combinations. In some configurations, step 1212 can include step 1214 of comparing the mobile device information with information sensed from onboard systems. For example, accelerometer data in the initial information for a particular time frame can be compared with accelerometer data from the onboard vehicle system for the same time frame. If the accelerometer data matches within a certain pre-determined percent error, the mobile device accelerometer information can be deemed accurate.

In further configurations, step 1212 can include step 1216 of performing error calculations on GPS data included with the mobile device information. For instance, location information from the mobile device based on GPS data can be evaluated for accuracy according to standard tests for GPS accuracy. The GPS tests can include tests known as user equivalent range error calculations (UERE), position dilution of precision calculations (PDOP), geometric dilution of precision computations (GDOP), interference calculations, and receiver autonomous integrity monitoring calculations (RAIM). If the GPS data of the initial information passes standard tests for accuracy, then the mobile device GPS information can be deemed acceptable.

In some configurations, step 1212 can include step 1218 of comparing the mobile device information with map data or other location information from the onboard vehicle system. The mobile device information can be derived from known mobile device tracking techniques such as cell tower location and signal strength information, location updates received from other devices such as other nearby mobile devices or stationary network communications devices, known location plus movement calculations, triangulation techniques, and GPS-based techniques. The mobile device information can be compared with geospatial location information for the onboard vehicle system including map data, such as its present location or its location(s) over a particular time frame. If the location information matches within a predetermined error percentage, the mobile device information can be deemed accurate.

In addition, many configurations can include other mechanisms and techniques for evaluating the validity of the first mobile device data. The method can further include step 1220 of evaluating whether the first mobile device information passed all tests for evaluating quality and validity. If so, the vehicle system can proceed to step 1222 of determining that the quality of the mobile device information is valid and, if not, the system can proceed to step 1224 of evaluating whether the mobile device information failed all tests for evaluating validity. If so, the vehicle system can proceed to step 1226 of determining that the veracity of the mobile device geospatial information is unacceptable or invalid. If not, the system can proceed to step 1228 of determining that particular features of the mobile device information are valid and acceptable, which can include identifying a particular subset of features that could be acceptable for integration and use with the onboard vehicle navigation system, such as using data from the mobile device's accelerometers, gyro, compass, visual identification modules, and/or communication capabilities.

While various configurations of the embodiments have been described, the description is intended to be exemplary, rather than limiting and it will be apparent to those of ordinary skill in the art that many more configurations and implementations are possible that are within the scope of the embodiments. Accordingly, the embodiments are not to be restricted except in light of the attached claims and their equivalents. Also, various modifications and changes may be made within the scope of the attached claims.

What is claimed is:

1. A vehicle system for a motor vehicle comprising:
an electronic control unit configured for installation and use as part of a motor vehicle;
an onboard navigation system;
an interface configured for enabling communication between the onboard navigation system and a mobile device;
a display device; and
a computer-readable medium in communication with the electronic control unit having stored thereon computer-readable instructions for instructing the electronic control unit to perform actions comprising:
receiving information from the mobile device;
computing a mobile device validity and quality rating for the information received from the mobile device;
computing an onboard validity and quality rating for information from the onboard navigation system;
evaluating the mobile device quality rating to determine whether the information received from the mobile device is accurate;
notifying a user, via the display device, whether the information received from the mobile device is determined to be accurate;
prompting the user, via the display device, to select whether to integrate at least one feature of the mobile device; and
integrating the at least one feature of the mobile device with the onboard navigation system for receiving further information from the mobile device when the information received from the mobile device is determined to be accurate and when the user selects, via the display device, to integrate the at least one feature of the mobile device.

2. The vehicle system according to claim 1, wherein the computer-readable instructions for instructing the electronic control unit to perform actions further comprise:
transmitting the information from the mobile device to another vehicle via vehicle-to-vehicle communications.

3. The vehicle system according to claim 1, wherein the computer-readable instructions for instructing the electronic control unit to perform actions further comprise:
determining the information received from the mobile device is accurate if the mobile device quality rating meets a quality threshold.

4. The vehicle system according to claim 3, wherein the quality threshold includes the information received from the mobile device substantially matching map information associated with the onboard navigation system.

5. The vehicle system according to claim 4, wherein the quality threshold includes a match between data point locations of the information received from the mobile device and data point locations of map data from the onboard navigation system within a predetermined variance.

6. The vehicle system according to claim 4, wherein the map information includes data for mapped objects and sensor feedback information for mapped objects sensed by the onboard navigation system.

7. The vehicle system according to claim 6, wherein the quality threshold includes data point locations of the information received from the mobile device matching data point locations of the map data and sensed object information.

8. The vehicle system according to claim 1, wherein evaluating the mobile device quality rating of the information from the mobile device includes performing location information error analysis calculations for the information received from the mobile device.

9. The vehicle system according to claim 8, wherein performing location information error analysis calculations includes performing error computations selected from the group consisting of: user equivalent range error calculations (UERE), position dilution of precision calculations (PDOP), geometric dilution of precision computations (GDOP), interference calculations, and receiver autonomous integrity monitoring calculations (RAIM).

10. The vehicle system according to claim 1, wherein the further information received from the mobile device is used to augment navigation information of the onboard navigation system.

11. The vehicle system according to claim 1, wherein integrating the mobile device with the navigation system for receiving the further information from the mobile device includes setting the further information as a primary source of information over the information from the onboard navigation system.

12. The vehicle system according to claim 1, wherein the computer-readable instructions for instructing the electronic control unit to perform actions further comprise:
comparing the mobile device validity and quality rating of the information received from the mobile device with the onboard validity and quality rating of the information from the onboard navigation system; and
setting the mobile device as the primary source for information over the onboard navigation system when the mobile device validity and quality rating of the information received from the mobile device is higher than the onboard validity and quality rating of the information from the onboard navigation system.

13. A method for providing navigation information for a motor vehicle, the method comprising:
automatically sensing a presence of a mobile device proximate the motor vehicle;
establishing communications between an onboard navigation system of the motor vehicle and the mobile device;
receiving information from the mobile device;
computing a mobile device validity and quality rating for the information received from the mobile device;
computing an onboard validity and quality rating for information from the onboard navigation system;
evaluating the mobile device quality rating to determine whether the information received from the mobile device is accurate;
notifying a user, via a display device, whether the information received from the mobile device is accurate;
prompting the user, via the display device, to select whether to use the information received from the mobile device to augment an operation of the onboard navigation system;
using the information received from the mobile device to augment the operation of the onboard navigation system when the information received from the mobile device is determined to be accurate and when the user selects, via the display device, to use the information received from the mobile device; and
preventing the onboard navigation system from using the information received from the mobile device when the information received from the mobile device is determined to be inaccurate and when the user selects, via the display device, not to use the information received from the mobile device.

14. The method according to claim 13, further comprising:
   determining the information received from the mobile device is accurate if the mobile device quality rating meets a quality threshold.

15. The method according to claim 14, wherein the quality threshold is determined by comparing the information received from the mobile device with map information associated with the onboard navigation system.

16. The method according to claim 13, wherein the information received from the mobile device is used as a primary source of information over the onboard navigation system when the mobile device quality rating of information from the mobile device is greater than the onboard quality rating of information determined for the onboard navigation system and when the user selects, via the display device, to use the information received from the mobile device.

17. The method according to claim 13, wherein the information received from the mobile device is map information.

18. The method according to claim 13, wherein the information received from the mobile device is image information.

19. The method according to claim 13, wherein the motor vehicle is capable of communicating the information received from the mobile device to another vehicle.

20. A method for providing navigation information for a motor vehicle, the method comprising:
   establishing communications between an onboard navigation system of the motor vehicle and a mobile device;
   receiving initial information from the mobile device;
   computing a mobile device validity and quality rating for the initial information received from the mobile device;
   computing an onboard validity and quality rating for information from the onboard navigation system;
   evaluating the mobile device quality rating of the initial information from the mobile device to determine whether the initial information received from the mobile device is accurate;
   notifying a user, via a display device, whether the initial information received from the mobile device is determined to be accurate;
   prompting the user, via the display device, to select whether to send additional information from the mobile device to another vehicle;
   sending the additional information from the mobile device to another vehicle when the initial information received from the mobile device is determined to be accurate and when the user selects, via the display device, to send the additional information to another vehicle; and
   preventing the additional information from the mobile device from being sent to the other vehicle when the initial information received from the mobile device is determined to be inaccurate and when the user selects, via the display, not to send the additional information to another vehicle.

21. The method according to claim 20, wherein the initial information is navigation information.

22. The method according to claim 20, wherein the initial information is image information.

23. The method according to claim 20, wherein the initial information is weather information.

24. The method according to claim 20, wherein the initial information is traffic information.

25. The method according to claim 20, wherein sending the additional information to the other vehicle occurs over a vehicle-to-vehicle communication network.

26. The method according to claim 20, wherein the additional information is sent by way of the mobile device.

* * * * *